May 19, 1970     S. F. ROE, JR     3,512,996

PACKAGING MILK

Filed June 27, 1966     3 Sheets-Sheet 1

INVENTOR.
SHELDON F. ROE, JR.
BY
ATTORNEYS

May 19, 1970     S. F. ROE, JR     3,512,996
PACKAGING MILK
Filed June 27, 1966     3 Sheets-Sheet 2
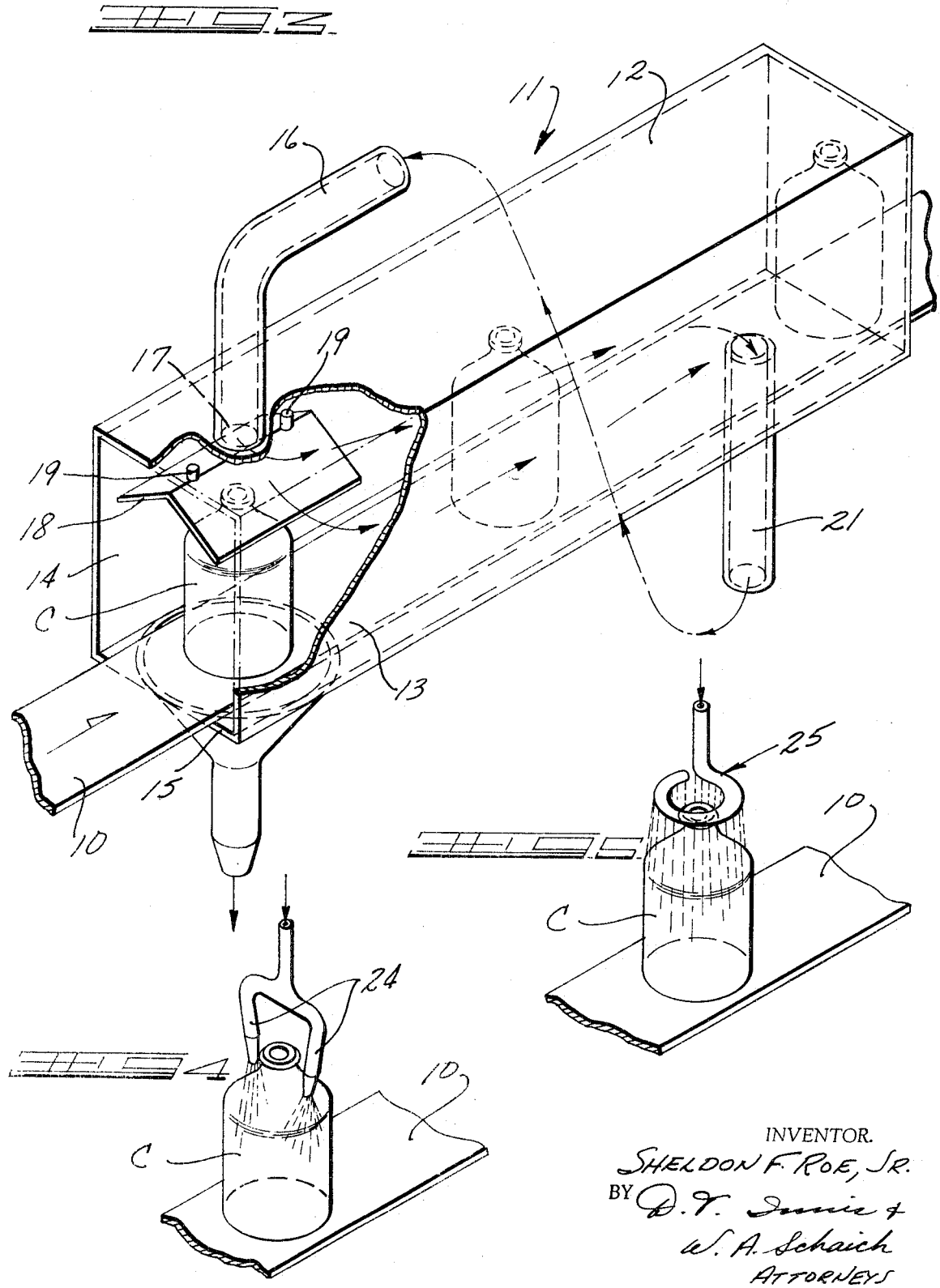
INVENTOR.
SHELDON F. ROE, JR.
BY
W. A. Schaich
ATTORNEYS

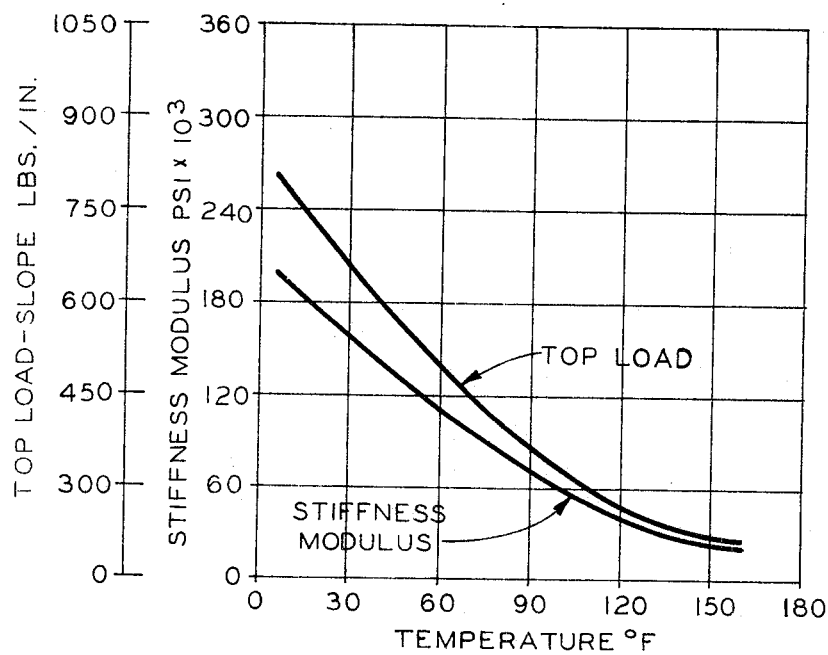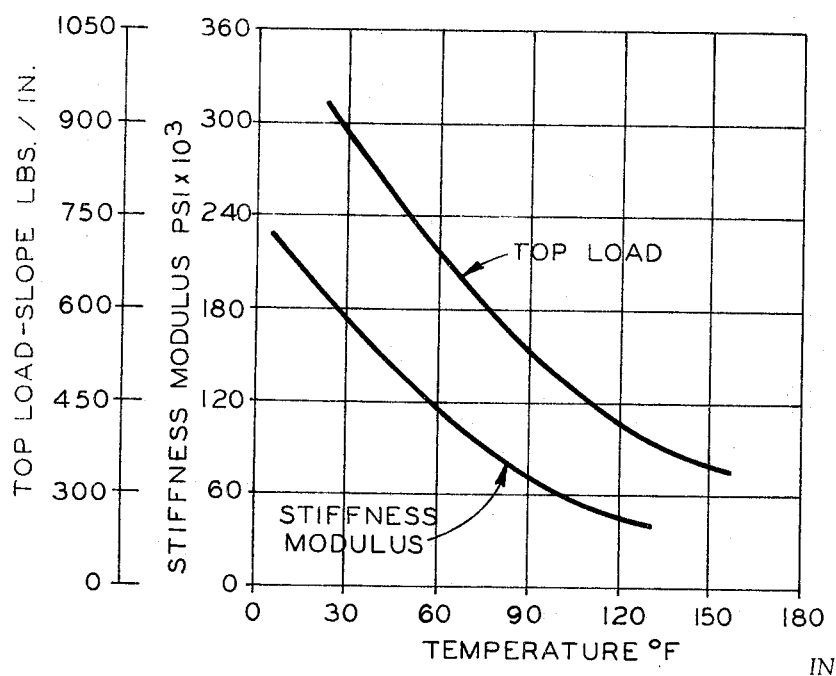

United States Patent Office

3,512,996
Patented May 19, 1970

3,512,996
PACKAGING MILK
Sheldon F. Roe, Jr., Toledo, Ohio, assignor to Owens-Illinois, Inc., a corporation of Ohio
Filed June 27, 1966, Ser. No. 560,649
Int. Cl. B29c 25/00
U.S. Cl. 99—171                     7 Claims

ABSTRACT OF THE DISCLOSURE

Thermoplastic containers are cooled to below room temperature causing an increase in the stiffness of the container side wall. The containers are vacuum filled with milk.

---

This invention relates to a method and apparatus for packaging fluent material in plastic containers.

More particularly, this invention relates to a method and apparatus for filling plastic containers with milk wherein the containers are cooled to below room temperature prior to introduction to the vacuum filling. In the filling of milk containers at the present time, which containers are normally made of glass or paper, it is customary, particularly in those cases where the milk is to be marketed in glass containers, to sterilize the containers and then fill them with cooled refrigerated milk.

With the advent of the plastic container, there is the distinct probability that milk products will be packaged in blown plastic containers and in order to utilize the present filling equipment (of the vacuum type), it is necessary to make the plastic containers of a relatively thick wall section in order to prevent excessive collapse thereof during the vacuum filling operation. This is particularly true where the vacuum fill arrangement is designed to deliver a quantity of milk to a container up to a certain height within the container.

It will be readily appreciated that if the container is collapsed, it will necessarily hold less milk than it would hold in its uncollapsed condition.

With the foregoing in view, it is an object of this invention to provide a method of conditioning plastic containers prior to the filling operation so as to render the walls of the container more rigid.

It is a further object of this invention to provide a method and apparatus for packaging milk in which the containers are formed of thermoplastic material in the dairy, and while still relatively hot and sterile from the forming, the containers are cooled to below room temperature and then filled with milk with the normal vacuum filling mechanism.

Other and further objects will be apparent from the following description, taken in conjunction with the annexed sheets of drawings, wherein:

FIG. 3 is a perspective view with a portion broken away illustrating the cooling section of FIG. 2;

FIG. 4 is a schematic perspective view of a second embodiment of the cooling system of the invention;

FIG. 5 is a perspective view of a third embodiment of the cooling system;

FIG. 6 is a graph showing the top load and stiffness modulus of a high density polyethylene plastic; and FIG. 7 is a graph, similar to FIG. 6, for a 40% heavier container weight than that of FIG. 6.

Figure 1:
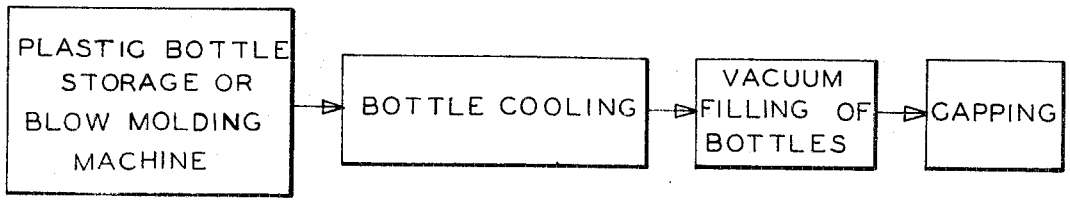
FIG. 1 is a block diagram of the process of the invention.

With reference to the drawings, and in particular FIG. 1, applicant's invention will be described in detail.

FIG. 1 is a block diagram of the packaging line which could be incorporated in a dairy and indicates that plastic milk bottles may be blow molded on the premises or brought from a storage area. If the bottles are blow molded on the premises, they leave the forming or molding machine at an elevated temperature in the neighborhood of 140° F. Even those bottles coming from storage may also have a temperature in excess of 100°. When plastic containers are at a temperature in excess of 100° or even at room temperature, their stiffness modulus and top load characteristics are quite low. As shown in FIGS. 6 and 7, the top load and stiffness modulus characteristics of high density polyethylene are quite temperature sensitive.

As can be seen when viewing FIGS. 6 and 7, which are actual curves made from data collected with respect to actual high density polyethylene containers, it can be seen that if the temperature of the container is lowered, its stiffness modulus increases and its top load characteristics increase. Both these factors are important from the standpoint that most dairies use vacuum filling equipment and if the application of a vacuum is applied to a polyethylene container for filling purposes, its stiffness modulus will determine to what degree the walls of the bottle will collapse. Substantial collapse of the bottle walls will result in failure of the containers in some instances or make it difficult to deliver to the bottles a predetermined measured amount of milk.

It is also important that the filling equipment not overload the container or that the container have sufficient top load resistance so that the container does not rupture due to the mechanical loading by the filling equipment. It can be seen that if the walls collapse or the top load characteristics are poor, then the container height is changed and the container will be foreshortened at the time of filling. Furthermore, the milk in the filler is cold and it would be advantageous to not have bottles which are at an elevated temperature.

By utilizing applicant's process, it is possible to form plastic containers which are of less thickness than would be normally necessary, to withstand the vacuum in the filling if the containers are first cooled to below room temperature, for example as much as to 5° F. Such a degree of cooling would result in a top load strength increase of from 5 to 10 times. The normal temperature of a dairy filling line is about 80° F. and if a polyethylene bottle will support 50 lbs. top load at 70° F., it will support 90 lbs. at 40° F. This ability to use containers in which the weight of the plastic is less, also resulting in thinner walls, is graphically illustrated in FIGS. 6 and 7, wherein FIG. 6 specifically shows the top load and stiffness modulus characteristics of a high density polyethylene bottle in relation to bottle temperature.

FIG. 7 shows the same characteristics for a high density polyethylene bottle, but in this case the polyethylene bottle is made 40% heavier. The increased plastic used will increase the top load characteristic by, in effect, moving the curve upward; however, the stiffness modulus is not changed to as great an extent, thus indicating that thinner walled containers may be produced with lower weights of plastic per bottle without sacrificing stiffness modulus characteristics and comparable top load characteristics for the containers may be obtained if the containers are cooled appreciably prior to being introduced to the vacuum filling equipment.

As indicated in FIG. 1, whether the plastic bottles come from a blow molding machine or from storage, the bottles are cooled below room temperature and while in this cooled condition, are introduced to the vacuum filling equipment and filled and capped.

It should be understood that the invention is not limited to the utilization of polyethylene as the plastic from which the containers are made and other plastics, such as polypropylene and nylon are suitable for the forming of milk bottles.

Data and curves have been developed for a number of other plastics and reference may be had to the published article of applicant appearing in the March 1966 issue of Modern Plastics at pages 124–127. The manner of measuring the stiffness modulus for developing these curves and the curves of FIGS. 6 and 7 was in accordance with the ASTM D–747 test, "Stiffness of Plastics by Means of a Cantilever Beam."

Stiffness specimens were cut directly from the blown containers and a Tinius Olsen stiffness tester was used to measure the flexural stiffness.

An Instron testing machine was used for the top load test. This consisted of applying a sufficient load in the longitudinal direction of the container to keep the deformation rate constant at 1 in./min. The load deflection curve was recorded simultaneously, using a chart speed of 5 in./min. and a full scale deflection of 200 pounds. The containers were empty, uncapped, and vented to prevent pressure buildup inside the container. The initial linear portion of the curve was used to calculate the slope in units of lb./in.

Thus it can be seen that it would be advantageous when using plastic containers for packaging milk or other liquid products in which vacuumizing of the container is a necessary step prior to filling, to cool the containers to a desired, preselected temperature below room temperature.

Figure 2:
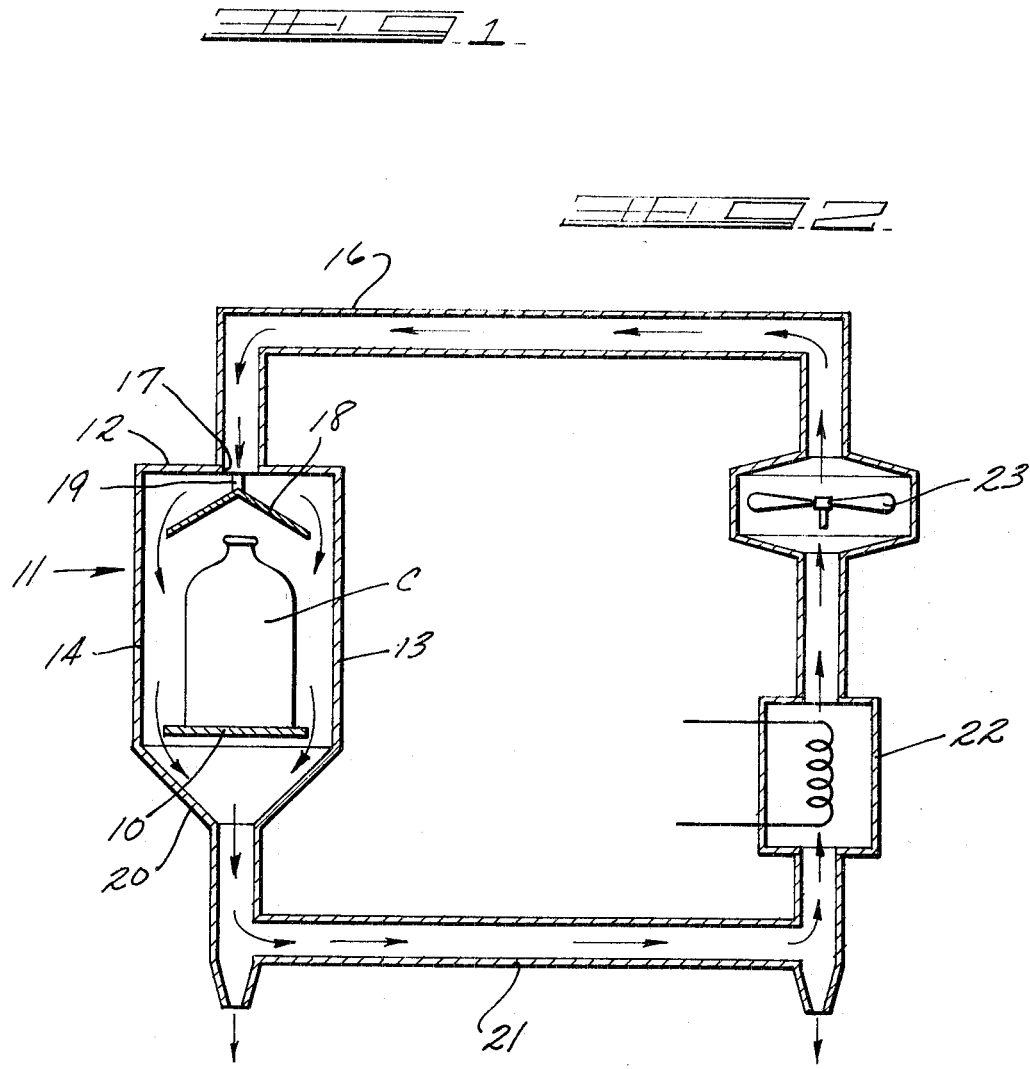
FIG. 2 is a vertical, sectional view of a cooling system of the invention.

With particular reference to FIGS. 2 and 3, an example of one embodiment of the cooling apparatus which may be utilized in a dairy, for example, will be described.

The containers C may be conveyed from a storage area or plastic blow molding machine while they are positioned upright at spaced intervals, on a moving conveyor 10. The conveyor 10 will move in the direction of the arrow shown thereon in FIG. 3 and will be spaced thereon depending upon the rate of infeed or loading on to the conveyor at the blow molding machine in relation to the speed of the conveyor. It should be understood that the conveyor will be moving at a rate such that the containers will be cooled to the extent necessary while positioned wtihin the cooling apparatus.

In the embodiment shown in FIGS. 2 and 3, the cooling apparatus takes the form of a tunnel 11 having a top wall 12, side walls 13 and 14 and bottom wall 15. The conveyor 10 will be moved through the tunnel, with its run slightly elevated above the bottom wall 15. The cooling fluid, which in this case may be air, is introduced into the tunnel through a pipe or conduit 16 connected to an opening 17 in the top wall of the tunnel 11, near the entrance or forward end of the tunnel. Directly beneath the opening 17 through which the air is introduced, is positioned a baffle or deflector 18. As shown, the baffle 18 is supported in spaced relation to the opening by a pair of posts 19 fixed to the under-surface of the top wall 12. In this manner, any condensation which may occur in the conduit 16 will be prevented from dropping into the mouth of the container and any drippage which may occur will fall from the deflector 18, along the sides of the tunnel and be collected within a funnel 20. The funnel 20 has its upper end fixed to the bottom wall 15 of the tunnel, it being understood that the tunnel bottom wall has an opening corresponding in size to the upper end of the funnel 20.

Downstream or adjacent the exit end of the tunnel 11, is an outlet conduit 21 opening into the bottom wall 15 of the tunnel and serves to draw cooled air along the length of the tunnel since the conduit 21 will be maintained at a reduced pressure.

The conduit 21 is utilized as a return connection to the air supply to a refrigerating unit 22 schematically shown in FIG. 2. Air is drawn through the refrigerating unit 22 by a fan 23, with the outlet of the fan being connected to the conduit 16. Again, as shown in FIG. 2, any condensate which may form in the system is permitted to drain by gravity through openings provided at the lowest points in the return conduit 21.

With the apparatus of FIGS. 2 and 3, it can be seen that refrigerated air is continuously circulated through the tunnel 11. The residence time of the containers within the tunnel 11 is controlled by the speed of the conveyor 10 so as to ensure cooling of the containers to the desired temperature below room temperature.

With particular reference to FIG. 4, a second embodiment of a cooling system is illustrated, wherein the containers are moved by the conveyor 10 beneath a pair of nozzles 24 which have their openings below the level of the container neck. In this particular arrangement, the nozzles 24 may be supplied by a gaseous coolant such as compressed $CO_2$. In this instance the containers will be directly impinged with the gaseous coolant, with the nozzles directing the coolant against the shoulder of the bottle and along the side walls thereof.

A third embodiment of the cooling arrangement is illustrated in FIG. 5 in which a pipe 25 is supplied with refrigerated water, which is in abundant supply in most dairies. The pipe 25 is bent, as shown in FIG. 5, into an annular shape lying in a horizontal plane above the height of the bottles. The pipe 25 is perforated in a pattern such that it will direct the coolant against the shoulder and along the side walls of the container when positioned thereberneath in axial alignment with the vertical axis of the bent portion of the pipe 25.

Obviously, both the nozzles 24 and the pipe 25 may be supplied from any suitable source of coolant.

While applicant has shown three systems or arrangements whereby the plastic containers may be cooled during their movement from the source of bottles to the filling equipment, it should be kept in mind that other cooling systems may be utilized which are effective to lower the temperature of the bottles to the desired degree below room temperature.

Other and further modifications may be resorted to within the spirit and scope of the appended claims.

I claim:

1. In the method of filling blown plastic containers wtih fluent material in which the containers are recently formed and in a warm condition, the improvement comprising the steps of subjecting the warm containers to a cooling medium for a time sufficient to lower the temperature of the container below room temperature so as to increase the stiffness modulus thereof and filling the container while at the reduced temperature.

2. The method of filling thermoplastic containers with milk comprising, the steps of cooling the container to a temperature between 0° F. and 60° F. whereby the stiffness of the container side wall is increased, vacuum filling the container and capping the filled container.

3. The method of packaging milk comprising, the steps of forming thermoplastic containers, moving the formed containers from the forming area into a cooling area, cooling the containers to a temperature below room temperature, vacuum filling the cooled containers and capping the filled containers.

4. The method of claim 3, wherein the step of cooling the containers comprises passing the containers through a tunnel and circulating a gaseous coolant through the tunnel in surrounding relation to the containers.

5. The method of claim 3, wherein the step of cooling the containers comprises directly impinging a cooling fluid on the exterior of the container.

6. The method of claim 5, wherein the cooling fluid is a compressed carbon dioxide.

7. The method of claim 5, wherein the cooling fluid is refrigerated water.

(References on following page)

References Cited

UNITED STATES PATENTS

| | | | |
|---|---|---|---|
| 3,065,501 | 11/1962 | Gasmire | 264—98 X |
| 3,127,458 | 3/1964 | Scott et al. | 264—98 |
| 3,161,525 | 12/1964 | Hey | 99—171 |
| 3,293,341 | 12/1966 | Boeke et al. | 264—94 |
| 3,350,839 | 11/1967 | Carter | 99—182 X |

A. LOUIS MONACELL, Primary Examiner

S. B. DAVIS, Assistant Examiner

U.S. Cl. X.R.

53—29; 99—183; 264—348